United States Patent [19]

Lackinger

[11] Patent Number: 4,629,825
[45] Date of Patent: Dec. 16, 1986

[54] ELECTRICAL CABLE GLAND EMBODYING SEALING ARRANGEMENT

[75] Inventor: Franz Lackinger, Krugersdorp, South Africa

[73] Assignee: Westward Investments Limited, Hong Kong, Hong Kong

[21] Appl. No.: 668,215

[22] Filed: Nov. 5, 1984

[30] Foreign Application Priority Data

Nov. 11, 1983 [ZA] South Africa ................ 83/8414

[51] Int. Cl.⁴ ........................................... H02G 15/04
[52] U.S. Cl. ................................................. 174/65 SS
[58] Field of Search .................................... 174/65 SS

[56] References Cited

U.S. PATENT DOCUMENTS 3,990,661 11/1976 De Groef .................. 174/DIG. 8
3,993,330 11/1976 Goransson .
4,352,950 10/1982 Meier ........................ 174/65 SS

FOREIGN PATENT DOCUMENTS 874973 8/1961 United Kingdom .
1010372 11/1965 United Kingdom .
1243572 8/1971 United Kingdom ............ 174/65 SS
1437338 5/1976 United Kingdom ............ 174/65 SS Primary Examiner—Arthur T. Grimley
Assistant Examiner—D. A. Tone
Attorney, Agent, or Firm—Stevens, Davis, Miller & Mosher

[57] ABSTRACT

A cable gland having two parts interconnected by a screw thread through which moisture may conceivably enter is provided. The screw threaded connection is between two parts of the cable gland and a skirt is sealed to the one part on one side of the outer end of the screw threads and sealingly engages a circular sealing surface on the cable gland part on the other side of the outer end of the screw threads. The skirt may be flexible and resilient itself or may be rigid with a sealing ring co-operating between it and the circular surface.

4 Claims, 2 Drawing Figures

ELECTRICAL CABLE GLAND EMBODYING SEALING ARRANGEMENT

FIELD OF THE INVENTION

This invention relates to electrical cable glands used at end regions of electrical cables and embodying a sealing arrangement and, more particularly, but not exclusively, to electrical cable glands embodying an armor clamp assembly for use on armored electrical cables.

BACKGROUND OF THE INVENTION

Electrical cable glands can be made to various different specifications such as, being simply waterproof, flame proof, or even explosion proof, and may, with this end in view embody various types of seals which seal onto the outer electrical insulating sheath and the inner electrically insulating sheath between which the armoring is generally clamped to the gland where such armoring is present.

Such cable gland arrangements often include a differential nut or sleeve, which is externally screw threaded, and co-operates with a complimentarily screw threaded socket or thimble forming part of the cable gland. The surfaces of such screw threads often communicate between the exterior of the cable gland and a position in between the inner and outer electrically insulating sheaths of a cable in use.

While experience has shown that moisture does not generally enter along this path it does, nevertheless, constitute a possible route whereby moisture can reach the cable armoring and any clamping means associated therewith. In the event that corrosion did set in, this could lead to breakage of the armoring, consequential opening of the usual ground circuit completed by the amoring, as well as loss of resistance to tensile forces imposed on a cable. Such tensile forces would, in consequence, be applied to the terminals of the electrical conductors with obviously undesirable results.

The object of this invention is, accordingly, to provide an electrical cable gland which is better protected against the ingress of such moisture.

SUMMARY OF THE INVENTION

In accordance with this invention there is provided an electrical cable gland of a type including at least a first part having an internally screw threaded socket or thimble and a second part defining an externally screw threaded sleeve or differential nut co-operating with the screw thread of the socket or thimble, one of said parts having a circular external surface adjacent the end thereof co-operating with the other part and which is sealingly engaged by a tubular skirt co-axial with the first and second parts of the cable gland and sealingly associated with said other part at its end remote from said one part.

Further features of the invention provide for said one part to be the first part, which defines the socket or thimble, in which case the said other part is the sleeve or differential nut; for the cable gland to be of a type embodying an armor clamp arrangement; for the armor clamp arrangement to be adapted for co-operation with either a helically wound armor strip or, alternatively, armor wires defining the armoring of a cable with which the gland is to be used; for the cable gland to have inner and outer seals adapted for co-operation with the inner and outer electrically insulating sheaths of an armored electrical cable; and for the skirt to form part of a body of plastic material moulded onto a spigot defining part of the cable gland to form a composite unit therewith.

Conveniently the skirt is made of a polyvinyl chloride material (P.V.C.) although any other suitable material may be employed. P.V.C. material is preferred simply because the electrically insulating sheaths are generally manufactured of P.V.C. material and, accordingly, the life expectancy of a sealing skirt can be matched with that of the cable itself.

Preferably the sleeve or differential nut defining part of the cable gland has an externally screw threaded tubular part extending away from the cable gland and whereby the gland may be secured to an aperture in a wall of an electrical connection box, or the like.

BRIEF DESCRIPTION OF THE DRAWINGS

In order that the invention may be more fuller understood two different embodiments thereof will now be described with reference to the accompanying drawings in which.

DETAILED DESCRIPTION WITH REFERENCE TO THE DRAWINGS

Figure 1:
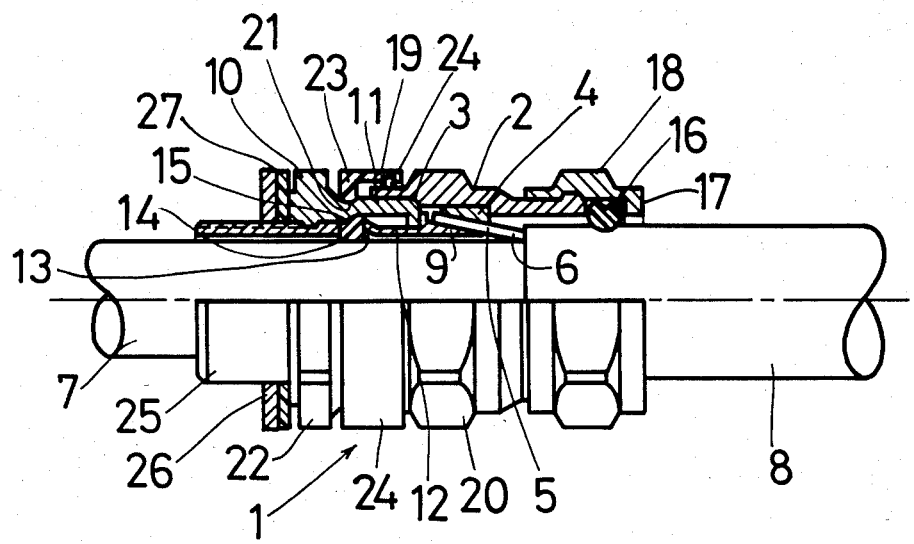
FIGS. 1 and 2 each illustrate, in partly sectioned longitudinal elevation, a different embodiment of cable gland according to this invention.

In the embodiment of the invention illustrated in FIG. 1 a cable gland, generally indicated by numeral 1, is of basically known type and includes a thimble part 2 defining a screw threaded socket 3 and having a relatively rotatable clamping member 4 therein having a truncated conical inner surface 5. Such inner surface 5 forms part of a clamp for armor wires 6 of an electrical cable armored by means of a plurality of wires wound to an extremely long helical pitch between an inner electrically insulating sheath 7 and an outer electrically insulating sheath 8.

An armor spreading cone 9 co-operates with the truncated conical surface 5 to form a clamp therewith.

The armor spreading cone is carried by a differential nut 10 having a spigot portion 11 externally screw threaded to be complimentary to the screw threads of the socket of the thimble.

A tubular extension 12 integral with the cone extends into the differential nut and is flared outwardly at its free end, as indicated by numeral 13, to hold the cone captive relative to the differential nut. The outwardly flared end furthermore, acts to compress an elastomeric inner seal 14 axially as the differential nut is screwed into the thimble so that the seal expands inwardly radially to effectively seal onto the outer surface of the inner electrically insulating sheath. A shoulder 15 is provided within the differential nut against which the seal abuts.

The opposite end of the cable gland is provided, in similar manner, with an elastomeric outer seal 16 compressible between the end of the part defining the thimble and an inwardly directed flange 17 on a union nut 18. The union nut has internal screw threads co-operating with an externally screw threaded surface of the thimble part 2.

The opposite end of the thimble part is provided with a smooth, circular cross-sectioned surface 19 on the outer surface adjacent its end remote from the outer seal 16 and adjoining an hexagonal formation 20 whereby the part can be rotated with the use of a wrench.

The differential nut, in this case, has a circular groove 21 in its surface between the screw threaded spigot part and adjacent hexagonal formation 22 whereby it may be rotated with the aid of a wrench.

A skirt defining member 23, made of relatively soft P.V.C. material forms a skirt 24 concentric with, but spaced apart from, the externally screw threaded spigot. The skirt sealingly engages the outer circular surface 19 of the thimble defining part and has an inwardly directed flange sealingly engaged in the groove 21 of the differential nut.

It will be seen by reference to FIG. 1 that the screw threads which co-operate between the thimble and differential nut do provide a possible passage for moisture ingress to a position between the inner and outer sheaths of the electrical cable. However, the skirt-defining seal member 23 effectively seals the outer entrance to such pathway and, accordingly, completes the sealing of the cable gland assembly.

Clearly the configuration of the skirt-defining member can be selected according to requirements as can the physical characteristics of the P.V.C. material forming it. Also the P.V.C. material could be replaced by any other suitable resilient and sealing material and, in fact, the skirt could be rigid and embody a resilient inwardly projecting ring, such as an O-ring, at its end which co-operates with the circular surface of the co-operating part. Thus, the invention includes within its scope, a rigid skirt having an elastomeric sealing ring co-operating between it and the external circular surface of the thimble part.

In order to complete the cable gland described above an externally screw threaded tubular part 25 is provided for passage through a hole in an electrical connection box, the wall of which is indicated by numeral 26. Any required sealing rings can be installed between the cable gland and the wall of the box as indicated by numeral 27.

The skirt-defining member 23 is, for immediate use, preferably permanently carried on either the thimble part or the differential nut, as the case may be, so that is automatically brought into operation when the two parts are interengaged.

Figure 2:
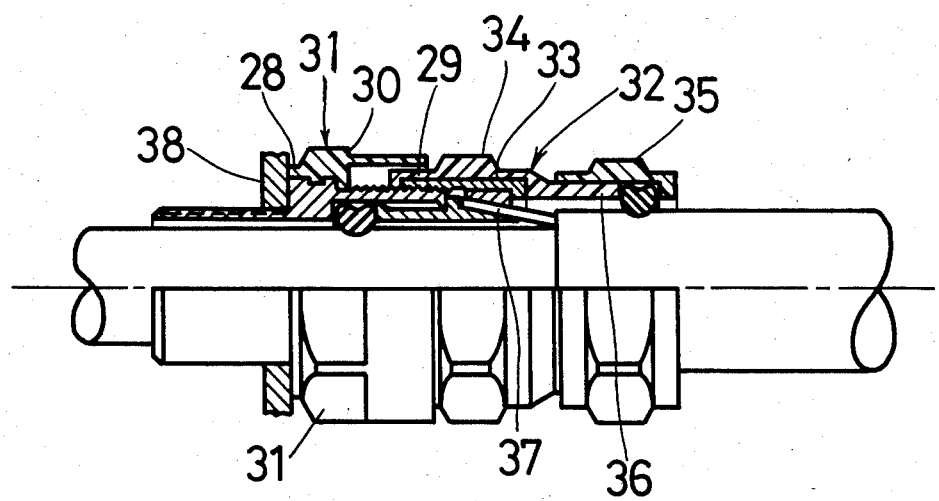

One alternative embodiment of the invention is illustrated in FIG. 2 of the accompanying drawings and, in that Figure, a substantially similar arrangement is provided apart from the fact that the skirt defining member is permanently moulded onto the differential nut. A composite differential nut unit 28 having a metal inner part 29 defining the spigot with which is associated the cone, and tubular extension having a circular and knurled outer surface onto which is moulded a P.V.C. layer 30 embodying the skirt. In this case a substantially more rigid P.V.C. is employed and, if it is found that the end thereof for sealing engagement with the outer surface of the thimble part is too rigid, an elastomeric sealing ring, as indicated above, can be included in the skirt. The hexagonal formation 31 can form part of the P.V.C. moulding provided that it is sufficiently rigid to be turned by a wrench.

In this particular embodiment of the invention the thimble part itself, indicated by numeral 32, can include an electrically conductive inner part 33 onto which is moulded an outer part 34 of P.V.C. material and, in this case, the entire outer surface can be of P.V.C. material.

In this manner a cable gland having a completely plastic outer surface can be manufactured where the union nut 35 and co-operating tubular part 36 of the thimble part of the cable gland are also made of P.V.C. or other suitably moulded, electrically insulating plastic material. In this case all metal parts within the cable gland, and which are necessary in order to provide electrical continuity between the electrically conductive armor wires 37 and a junction box wall 38, are provided but are protected by the plastic material.

It will be understood that the cable gland is in no way limited to being of the type described above and numerous different forms of cable gland can fall within the scope of this invention. Each one may have its own method of anchoring it to any armoring of the cable and, indeed, the invention extends beyond cable glands having cable anchors therein. Indeed, it extends to any cable gland in which an externally screw-threaded spigot part co-operates with an internally screw-threaded socket part and a seal at the outer end of such screw thread is required.

Also, the material from which the skirt is made could be any suitable material other than P.V.C. and may be chosen for its physical properties, in particular its temperature and corrosion resistance.

The invention therefore provides an extremely simple yet highly effective method of completing sealing arrangements where screw-threaded spigots and sockets interengage in electrical cable glands.

What I claim as new and desired to secure by Letters Patent is:

1. An electrical cable gland comprising a first part having an internally screw-threaded socket or thimble and a second part defining an externally screw-threaded sleeve or differential nut co-operating with the screw-thread of the socket or thimble, said first and second parts having operatively associated therewith co-operating parts of an armor clamp arrangement, the first and second parts each having an electrically conductive inner part to be operatively electrically connected to electrically conductive armoring of an armored electrical cable via the armor clamp arrangement and a body of electrically insulating material moulded onto the outside of the first and second parts, a portion at one end of said bodies forming a tubular skirt extending from either the first or the second parts to co-operate sealingly with a circular external sealing surface of the other of such first and second parts, an outer seal at one end of the cable gland being the end through which an armored zone of a cable may operatively enter the gland, and an externally screw threaded sleeve or tubular portion of electrically conductive material at the other end to operatively accomodate an unarmored zone of an electrical cable to be passed therethrough, such sleeve or tubular portion to be operatively electrically connected to the armoring of a cable by way of the conductive part of the first or second parts, or both, the operative cable gland with the sleeve or tubular part to be connected to a connection box presenting a substantially unbroken electrically insulating external surface.

2. An electrical cable gland as claimed in claim 1 in which there is included an inner seal operative to seal the gland to the unarmored portion of the electrical cable.

3. An electrical cable gland as claimed in claim 1 in which the outer seal is defined by a union nut made of electrically insulting material and an axially compressible elastomeric seal co-operable therewith.

4. An electrical cable gland as claimed in claim 1 in which the skirt is integral with the electrically insulating cover of the first or second part.

* * * * *